United States Patent
Gupta et al.

(10) Patent No.: US 8,333,242 B2
(45) Date of Patent: Dec. 18, 2012

(54) THERMOTHICKENER POLYMER AND SURFACTANT COMPOSITION AND METHODS OF EMPLOYING THE COMPOSITION

(75) Inventors: D.V. Satyanarayana Gupta, The Woodlands, TX (US); Madhukar Chetty, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 736 days.

(21) Appl. No.: 12/371,395

(22) Filed: Feb. 13, 2009

(65) Prior Publication Data

US 2010/0206569 A1   Aug. 19, 2010

(51) Int. Cl.
*E21B 36/00* (2006.01)
*C09K 8/56* (2006.01)

(52) U.S. Cl. ........ 166/302; 166/288; 166/300; 507/216; 507/221; 507/225

(58) Field of Classification Search .................. None
See application file for complete search history.

(56) References Cited

U.S. PATENT DOCUMENTS

| | | | | |
|---|---|---|---|---|
| 4,892,916 A | * | 1/1990 | Hawe et al. | 526/304 |
| 5,478,602 A | * | 12/1995 | Shay et al. | 427/389 |
| 6,046,140 A | | 4/2000 | Woo et al. | |
| 7,385,019 B2 | | 6/2008 | Maroy et al. | |
| 2008/0121395 A1 | | 5/2008 | Reddy | |

FOREIGN PATENT DOCUMENTS

EP    0583814 B1    10/1998

OTHER PUBLICATIONS

Tridecyl Alcohol Ethoxylates. http://chemicalland21.com/specialtychem/perchem.

* cited by examiner

*Primary Examiner* — Zakiya W Bates
(74) *Attorney, Agent, or Firm* — Parsons Behle & Latimer

(57) ABSTRACT

A thermothickening composition includes a surfactant; and a thermothickening polymer that is the product of at least the following monomers: a non-ionic hydrosoluble unsaturated amide monomer; an ionic monomer; and an unsaturated dicarboxylic acid half ester having a heat sensitive functional group.

35 Claims, 3 Drawing Sheets

THERMOTHICKENER POLYMER AND SURFACTANT COMPOSITION AND METHODS OF EMPLOYING THE COMPOSITION

BACKGROUND

The present disclosure relates generally to a thermothickening composition comprising a thermothickening polymer and surfactant, and to methods for servicing a well bore using the thermothickening composition.

Natural resources such as gas and oil can be recovered from subterranean formations using well-known techniques. The processes for preparing a well bore for the recovery of such resources often employ various well bore servicing fluids. For example, drilling fluids or muds are typically circulated through well bores as they are drilled into the formation. During the drilling process, the drill bit generates drill cuttings that include small pieces of shale and rock. The drilling fluid carries the drill cuttings in a return flow stream back to the well drilling platform. After terminating the circulation of the drilling fluid, a string of pipe, e.g., casing, is run into the well bore. The drilling fluid is then usually circulated downwardly through the interior of the pipe and upwardly through an annulus, which is located between the exterior of the pipe and the walls of the well bore.

Another fluid known as a gravel packing fluid having relatively large grained sand, e.g., gravel, suspended therein also may be utilized to prevent migration of smaller grained sand from the subterranean formation into the well bore and to maintain the integrity of the formation. In particular, a permeable screen may be placed against the face of the subterranean formation, followed by pumping the gravel packing fluid into the annulus of the well bore such that gravel becomes packed against the exterior of the screen. In addition, a cement slurry may be pumped into the well bore during a primary cementing process in which the cement slurry is placed in the annulus of the well bore and permitted to set into a hard mass (e.g., sheath) to thereby attach the string of pipe to the walls of the well bore and seal the annulus. Subsequent secondary cementing operations, e.g., completion and work over operations, may also be performed using cement slurries.

Yet another fluid, known as a fracturing fluid, is often used to fracture the subterranean formation. The fracturing fluid is pumped into the well bore at a rate and a pressure sufficient to form fractures that extend into the subterranean formation, providing additional pathways through which fluids being produced can flow into the well bores. The fracturing fluid is usually a water-based fluid containing a gelling agent, e.g., a polymeric material that absorbs water and forms a gel as it undergoes hydration. The gelling agent serves to increase the viscosity of the fracturing fluid. The fracturing fluid also typically includes particulate matter known as a proppant, e.g., graded sand, bauxite, or resin coated sand, may be suspended in the fracturing fluid. The proppant becomes deposited into the fractures and thus holds the fractures open after the pressure exerted on the fracturing fluid has been released.

Well bore servicing fluids often include rheology-modifying agents, such as viscosification agents (e.g., gelling agents). Viscosification agents can reduce or prevent well known problems associated with, for example, thermal thinning of fluids as they pass down the well bore. An example of such problems includes the inability of drilling fluid to suspend drill cuttings therein as it flows back to the surface. Thus, the drill cuttings may settle out of the drilling fluid and become deposited in undesired locations in the well bore. Furthermore, those fluids containing particles such as a cement slurry, a gravel packing fluid, and a fracturing fluid may experience settling of the particles as the fluids are pumped down the well bore. As a result, the particles are not transported to their proper locations in the well bore. Further, in the absence of such particles, the density of the fluids may drop to a level at which they are incapable of withstanding relatively high fluid pressures downhole, particularly in the case of a high density cement slurry. A need therefore exists for maintaining the viscosity of fluids as they are passed into a well bore so as to reduce or prevent the unwanted settling of materials in those fluids.

Additionally, during certain processes it is advantageous to employ a fluid that can increase in viscosity as it passes down the well-bore. For example, in fracturing processes, the fracturing fluid's viscosity is proportionally related to the created fracture geometry and fracture width so that the more viscous fluids will produce longer and wider fractures. However, pumping very viscous fluids at the well surface can be difficult. Thermoviscosifying agents that allow a fluid to increase in viscosity as it is introduced to higher subterranean temperatures have been known in the art for increasing fluid viscosity during the fracturing process, while still allowing the fluid to remain less viscous at the surface. However, providing new compositions having improved thermoviscosification properties for use in such processes would be a desirable contribution to the art.

SUMMARY

An embodiment of the present disclosure is directed to a thermothickening composition comprising: a surfactant; and a thermothickening polymer that is the product of at least the following monomers: a non-ionic hydrosoluble unsaturated amide monomer; an ionic monomer; and an unsaturated dicarboxylic acid half ester having a heat sensitive functional group.

A thermothickening composition comprising: a surfactant; and a thermothickening polymer having formula 5

$$A_x B_y C_z \qquad (5)$$

where A is an ionic functional group; B is a non-ionic hydrosoluble unsaturated amide functional group; C is an unsaturated dicarboxylic acid half ester unit having a heat sensitive functional group; x ranges from about 5 to about 50 wt %, y ranges from about 10 to about 50 wt. % and z ranges from about 10 to about 70 wt %, where x, y and z represent the weight % of the corresponding polymer units based on the total molecular weight of the polymer.

A gel made by the process comprising: mixing a surfactant and a thermothickening polymer that is the product of at least a non-ionic hydrosoluble unsaturated amide monomer, an ionic monomer and an unsaturated dicarboxylic acid half ester having a heat sensitive functional group to form a mixture; and exposing the mixture to heat sufficient to cause the mixture to form a gel.

Figure 1:
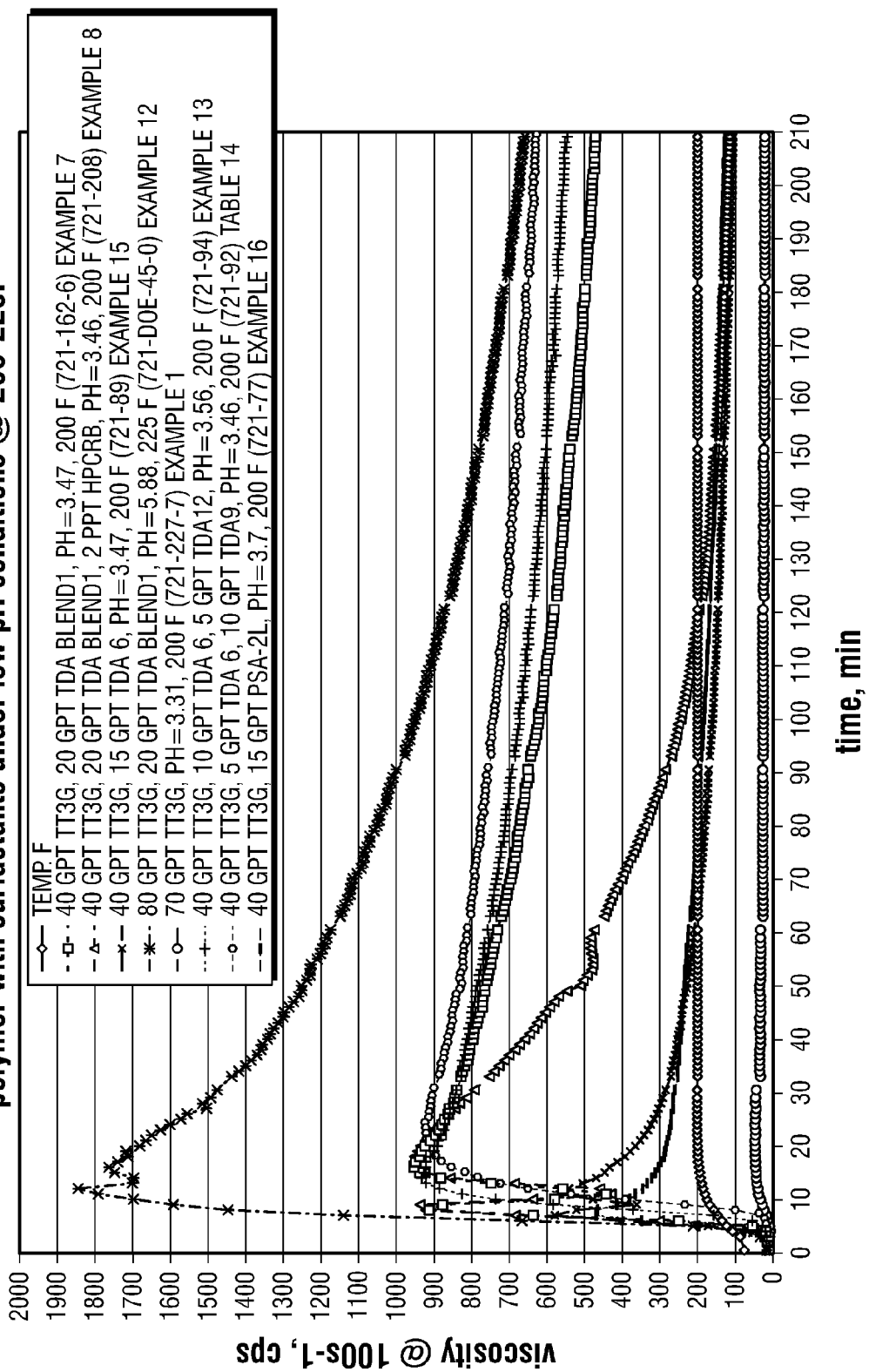
FIGS. 1 to 3 illustrate examples of the rheology of various compositions, according to embodiments of the present disclosure.

While the disclosure is susceptible to various modifications and alternative forms, specific embodiments have been shown by way of example as will be described in detail herein. However, it should be understood that the disclosure is not intended to be limited to the particular forms disclosed.

Rather, the intention is to cover all modifications, equivalents and alternatives falling within the spirit and scope of the invention as defined by the appended claims.

DETAILED DESCRIPTION

The present disclosure is directed to a thermothickening composition comprising i) a surfactant and ii) a thermothickening polymer that is the product of at least the following monomers: a non-ionic hydrosoluble unsaturated amide monomer; an ionic monomer; and an unsaturated dicarboxylic acid half ester having a heat sensitive functional group. Various embodiments of this composition will be described below.

The surfactant can be any suitable surfactant that will provide for the desired thermothickening properties when employed with the thermothickening polymer. The surfactant can be chosen from ionic and nonionic surfactants. In an embodiment, the surfactant comprises an alkoxylated alcohol, such as alkyl alcohol alkoxylates. Examples of suitable alkyl alcohol alkoxylates include ethoxylated alcohols of Formula 1, below:

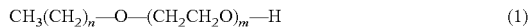

$$CH_3(CH_2)_n-O-(CH_2CH_2O)_m-H \quad (1)$$

where m is chosen to be an integer ranging from about 3 to about 20, and n is chosen to be an integer ranging from about 5 to about 20. In a further example, n is chosen to be 12 and m ranges from about 6 to about 12. Examples of commercial surfactants that can be employed include branched alcohol ethoxylates available from Sasol, such as NOVELL II TDA-6, TDA-9 and TDA-12®; and PSA2L® available from BJ Services Company.

In an embodiment, the surfactant can comprise a mixture of two or more different surfactants. For example, two or more ethoxylated alcohols having different chain lengths can be employed, such as a mixture of a first ethoxylated alcohol of formula 1 having n equal to 12 and m equal to 6 and a second ethoxylated alcohol of formula 1 having n equal to 12 and m equal to 9 or 12. It has been found that the viscosity achieved by the thermothickening compositions can be varied by using different mixtures of surfactants of varying chain lengths, according to an embodiment of the present application.

The amide monomer employed in producing the thermothickener compound used in the compositions of the present application can be any suitable non-ionic hydrosoluble unsaturated amide compound. In an embodiment, compounds of formula 2 can be used:

$$R^1CONR^2R^3 \quad (2)$$

where $R^1$ is a linear or branched group chosen from alkyl or alkenyl groups and $R^2$ and $R^3$ can be hydrogen or linear or branched groups chosen from alkyl or alkenyl groups, where at least one of $R^1$, $R^2$ and $R^3$ is an alkenyl. Examples of suitable amides include acrylamide; N-substituted hydrosoluble derivatives of acrylamide, such as N,N-dimethylacrylamide; and hydrosoluble N-vinylamides, such as N-vinylacetamide.

The ionic monomers of the present application can be anionic monomers or cationic monomers. Examples of suitable anionic monomers include acrylic acid and salts thereof, methacrylic acid and salts thereof, maleic anhydride, acrylamido-methylpropyl sulfonic acid and salts thereof, styrenesulfonic acid and salts thereof, and vinylsulfonic acid and salts thereof. Examples of suitable cationic monomers include quaternised or non-quaternised vinylpyridine with a pH of less than 2, and quaternised or non-quaternised N-vinylimidazole with a pH of less than 7.

Other examples of suitable non-ionic and ionic monomers are disclosed in U.S. Pat. No. 7,385,019, the description of which is hereby incorporated by reference in its entirety. In an embodiment, the non-ionic monomer is acrylamide (AM) and the ionic monomer is acrylamido-methylpropyl sulfonic acid (AMPS).

The unsaturated dicarboxylic acid half ester employed in producing the thermothickener compound used in the compositions of the present application can be any suitable unsaturated dicarboxylic acid half ester with a heat sensitive functional group. In an embodiment, compounds of formula 3 can be used:

$$HOOC-R^4-COOR^5 \quad (3)$$

where $R^4$ is a $C_2$ to $C_8$ alkenyl group; and $R^5$ is any suitable heat sensitive group.

Examples of suitable heat sensitive groups include side chains chosen from methylcellulose, hydroxypropylcellulose, polyvinyl alcohol-vinyl acetate copolymers, poly(ethylene glycol), polypropylene glycol, polymethacrylic acid, poly-N-vinyl-oxazolidone, partially acetalized polyvinyl alcohol, partially cyanoethylated polyvinyl alcohol, poly-N-isopropylacrylamide, poly(vinyl methyl ether), poly-L-proline, other polyamino acids and proteins, and copolymers made from hydrophobic and hydrophilic monomers. In one embodiment, the heat sensitive group can be a substituted or unsubstituted side chain chosen from polyoxyethylene chains (POE), polyoxypropylene chains (POP) or a polymer chain comprising units of both oxyethylene and oxypropylene. The side chain can include other suitable substituent groups that will not substantially interfere with the desired heat sensitive properties, such as, for example, hydroxyl groups, carboxyl groups, or unsaturated dicarboxylic acid units, such as radicals of maleic acid.

In an embodiment, the unsaturated dicarboxylic acid half ester can be a maleic acid half ester having a heat sensitive group. One such exemplary compound is shown by formula 4:

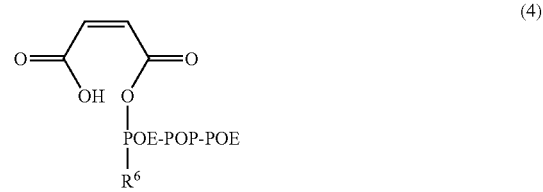

(4)

where $R^6$ is chosen from —OH, —OC(O)C=CC(O)OH, and —OC(O)C=CC(O)O—POE-POP—POE-OH.

The thermothickening polymers employed in the present application can be made using the above described monomers using well known polymerization techniques. The monomers can be mixed and reacted in any suitable order. For example, the thermothickening polymer can be made by mixing a non-ionic hydrosoluble unsaturated amide monomer and ionic monomer. An unsaturated dicarboxylic acid half ester having a heat sensitive functional group can then be added and the mixture reacted using a suitable initiator. In yet another embodiment, all three monomers can be mixed simultaneously with the initiator.

Any suitable initiator can be employed. An example of a suitable initiator includes a REDOX initiator, which can comprise an oxidant, for example Ammonium persulphate, and/or a reducing agent, for example Ascorbic acid. Other examples of suitable initiators are well known.

The temperature employed for the polymerization can be any suitable temperature that will result in the desired polymer reaction, and may depend on the initiating system chosen. The concentrations of monomers employed can vary according to the desired concentrations of polymer units in the polymer, as described below.

Other suitable methods can be employed for making the thermo-thickening polymers employed in the present application. For example, instead of employing one or more of the above monomers, grafting or hydrolysis methods can be used to graft one or more of the desired functional groups into the polymer. Examples of well known grafting and hydrolysis techniques are described in U.S. Pat. No. 7,385,019, the description of which is hereby incorporated by reference in its entirety.

The resulting thermothickener can include a polymer of the formula 5, $$A_x B_y C_z \quad (5)$$

where A is an ionic functional group corresponding to the ionic monomers described herein; B is a non-ionic hydrosoluble unsaturated amide functional group corresponding to the non-ionic monomers described herein; C is a unsaturated dicarboxylic acid half ester unit having a heat sensitive functional group, corresponding to the dicarboxylic acid half ester monomers described herein; x ranges from about 5 to about 50 wt %, y ranges from about 10 to about 50 wt. % and z ranges from about 10 to about 70 wt %, such as about 50%, where x, y and z represent the weight % of the corresponding polymer units based on the total molecular weight of the polymer. The molecular weight of the resulting polymers can be any suitable molecular weight that will provide for the desired viscosification properties. Exemplary molecular weights can range from about 300,000 g/mol to about 2,000,000 g/mol or more, as determined by gel permeation chromatography techniques.

An example of a suitable thermothickening polymer reaction product is shown below:

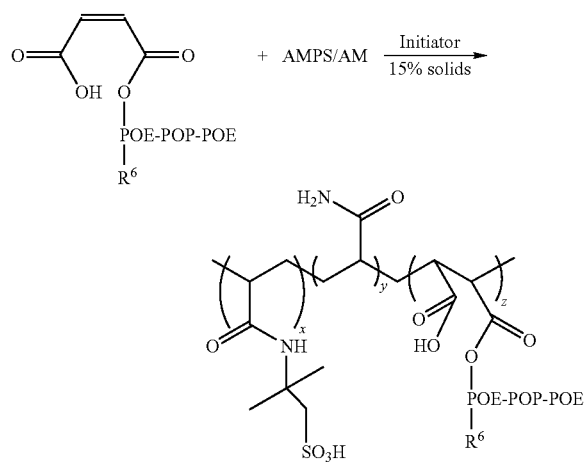

where $R^6$ is chosen from —OH, —OC(O)C=CC(O)OH, and —OC(O)C=CC(O)O—POE-POP—POE-OH; x ranges from about 5 to about 50 wt %, y ranges from about 10 to about 50 wt. % and z ranges from about 10 to about 70 wt %, such as about 50%, where x, y and z represent the weight % of the corresponding polymer units based on the total molecular weight of the polymer. The example product can have a solids content of about 15% to about 20%, by weight relative to the total weight of the product composition. The example thermothickener product can also include, for example, residual AM of about 800 ppm or less, such as about 100 ppm or less and/or residual AMPS of about 2000 ppm or less, such as about 1000 ppm or less. The example thermothickener product can have a viscosity of about 3000 cps and a molecular weight of about 1,300,000 g/mol as determined by gel permeation chromatography. An example of such a thermothickening polymer is commercially available from Rhodia under the tradename 07CRU 140 (15 wt %).

In addition to the thermothickening polymer, the reaction product can also contain residual reactants, such as AM and AMPS, as well as other ingredients that may be employed, such as antifoam agents. The product can include a solids content of any suitable amount.

The resulting thermothickening polymer product can be mixed with the surfactants of the present application to form a desired thermothickening composition. By including the surfactants of the present application, improved viscosification properties can be achieved. For example, in embodiments, a higher viscosity can be realized at a given temperature compared with the viscosity that would be achieved using the thermothickening polymer without the surfactant.

While not intending to be limited by theory, it is believed that the increased viscosity may occur, at least in part, because of the formation of an association system and/or complex, which may include association due to, for example, hydrogen bonds and/or Van Der Waals forces formed between the thermothickening polymers and surfactants. This association system may allow for increased gelation of the thermothickening polymer at higher temperatures compared to the gelation that would occur if the surfactants were not employed.

The surfactant and thermothickening polymer can be employed together in any suitable ratio that provides for the desired thermothickening properties. For example, the weight ratio of thermothickening polymer to surfactant can range from about 0.2 to about 10, preferably from about 0.5 to about 4.5. The percent by weight of thermothicking polymer can be any suitable amount that will provide the desired thermothickinging properties. Examples of suitable amounts of thermothickening polymers can range from about 1% to about 25% by weight thermothicking polymer, such as about 10% to about 20% by weight, such as about 15% by weight, relative to the total weight of the composition.

As discussed above, the compositions of the present application can be employed for servicing oil wells and natural gas wells, including subsea wells. Examples of such fluids include: drilling fluids, gravel packing fluids, fracturing fluids, frac packing fluids, completion fluids, and fluids used for completion pills. In an embodiment, the thermoviscosifying compositions of the present application are used as fracturing fluids.

Thus, the present disclosure can be directed to a method of drilling an oil or natural gas well bore in which the compositions of the present application are utilized as a drilling fluid. In an embodiment, thermoviscosifying compositions of the present disclosure comprise an aqueous media and the thermoviscosifying polymer/surfactant compositions of the present application can be circulated through a well bore as it is drilled into a subterranean formation. The drilling fluid can carry drill cuttings created by the drilling process in a return flow stream back to the well drilling platform. As the fluid is exposed to heat due, for example, to higher temperatures found deep in the earth, sufficient heating of the fluid can occur to cause the composition to realize an increase in viscosity compared to the initial viscosity of the fluid. The circulation of the drilling fluid can be terminated after drilling is stopped. Then a string of pipe, such as, for example, an annular pipe casing, can be run into the well bore. In an optional second stage of the process, the thermoviscosifying compositions of the present application can then be circulated through the well bore to remove additional drill cuttings. For example, the thermoviscosifying compositions can be pumped downwardly through the interior of the pipe and upwardly through an annulus, which is located between the exterior of the pipe and the walls of the well bore, to thereby carry the cuttings out of the well bore.

In an embodiment, the drilling fluid used during the second stage of the process may be different than the drilling fluid used during the drilling stage. For example, the thermoviscosifying compositions of the present disclosure can be employed during the drilling stage, while a second drilling fluid other than the thermoviscosifying compositions of the present disclosure can be employed during the second stage, or vice versa.

The thermoviscosifying compositions of the present application can be employed as gravel packing fluids. In an embodiment, a thermoviscosifying composition comprising an aqueous media and the thermoviscosifying polymers/surfactants of the present application can further comprise gravel suspended therein. As part of the gravel packing process, a permeable screen may be placed against the face of a subterranean formation, followed by pumping the thermoviscosifying composition comprising the gravel into an annulus of the well bore such that gravel becomes packed against the exterior of the screen.

The thermoviscosifying compositions of the present application can also be employed as fracturing fluids. In an embodiment, a thermoviscosifying composition of the present disclosure comprising an aqueous media and the thermoviscosifying polymers/surfactants of the present application can be used to fracture a subterranean formation. The thermoviscosifying composition is pumped into the well bore at a rate and a pressure sufficient to form fractures that extend into the subterranean formation, providing additional pathways through which fluids being produced can flow into the well bores. As the fluid is exposed to heat due, for example, to higher temperatures found deep in the earth, sufficient heating of the fluid can occur to cause the composition to realize an increase in viscosity compared to the initial viscosity of the fluid. In an embodiment, the thermoviscosifying composition can include a proppant. Well known proppants used in fracturing include graded sand, bauxite, or resin coated sand, any of which may be suspended in the fracturing fluid. The proppant becomes deposited into the fractures and thus holds the fractures open after the pressure exerted on the fracturing fluid has been released.

The compositions of the present disclosure, whatever the use, can comprise dispersed liquid particles (emulsified droplets) or dispersed solid particles. Liquid particles can, for example, be synthetic oils (for example silicone oils) or oils of vegetable or mineral origin. The solid particles can in particular be sand, density-modifying particles, debris and/or polymeric particles. The polymer can promote the suspending of these particles during the time necessary for the use of the composition and/or during a storage time. It can also alternatively contribute to easy transportation of the particles, in order to position them at or to move them to an appropriate spot.

The fluids of the present disclosure can include additional ingredients to modify the rheological and chemical properties of the fluid. Clayey materials such as bentonite, attapulgite, sepiolite or other material commonly used in drilling fluids can be included to provide drilling muds to lubricate the drill strings and suspend drill cuttings.

The fluids can also include buffering agents or pH control additives. Buffering agents can be used in the thermoviscosifying compositions to maintain the desired pH of the fluid. Examples of suitable buffering agents include, but are not limited to: sodium phosphate, sodium hydrogen phosphate, boric acid-sodium hydroxide, citric acid-sodium hydroxide, boric acid-borax, sodium bicarbonate, ammonium salts, sodium salts, potassium salts, dibasic phosphate, tribasic phosphate, lime, slaked lime, magnesium oxide, basic magnesium carbonate, calcium oxide and zinc oxide.

The fluids of the present disclosure can have a pH ranging from about 3 to about 10. At relatively low pHs of about 3.5 to about 6, the fluids are compatible with $CO_2/N_2$ gas, and thus can be foamed therewith, as is well known in the art.

Prior to being thermally activated in order to increase viscosity, the fluids of the present application can exhibit relatively low friction pressures. After the viscosity is increased by thermal activation, the viscosity of the fluids of the present application can be reduced using breaker agents, such as oxidizers and encapsulated oxidizers. For example, breaker agents can be added to the fracturing fluids of the present application after fracturing in order to allow the fluids to be more easily removed from the well. Any suitable breaker agents can be employed. Suitable breaker agents are well known in the art.

The temperature and the pressure of the fluids of the present application can vary according to the use which is made of the fluid and its environment. The thermothickening composition can remain effective over a relatively wide range of temperatures, including under conditions requiring relatively high temperatures, in particular in the fields of oil and/or gas extraction. For example, the composition can have a temperature ranging from about 20° C. to relatively high temperatures, such as greater than or equal to 50° C., greater than or equal to 70° C., greater than or equal to 100° C., greater than or equal to 150° C. or greater than or equal to 180° C. The pressure can be any suitable pressure, such as, for example, atmospheric pressure or a greater pressure.

Other characteristics or advantages of the compositions of the present disclosure may become apparent in the light of the examples which follow, given by way of illustration without a limiting nature.

EXAMPLES

Determination of Rheology of Fluid Systems Using Fann 50

A calculated amount of a thermothickening polymer of the present application was added to a calculated volume of either DI water or tap water being stirred at 500 rpm, using an overhead mixer. An amount of surfactant (TDA blend 1, TDA 6, 9, and 12 (From Sasol) or PSA-2L (from BJ Services Co.); where the TDA blend 1 is a 2:1 by volume mixture of TDA 6 and TDA 9) was added and continued to be mixed until a homogeneous phase was obtained. The pH of the system was noted.

Figure 2:
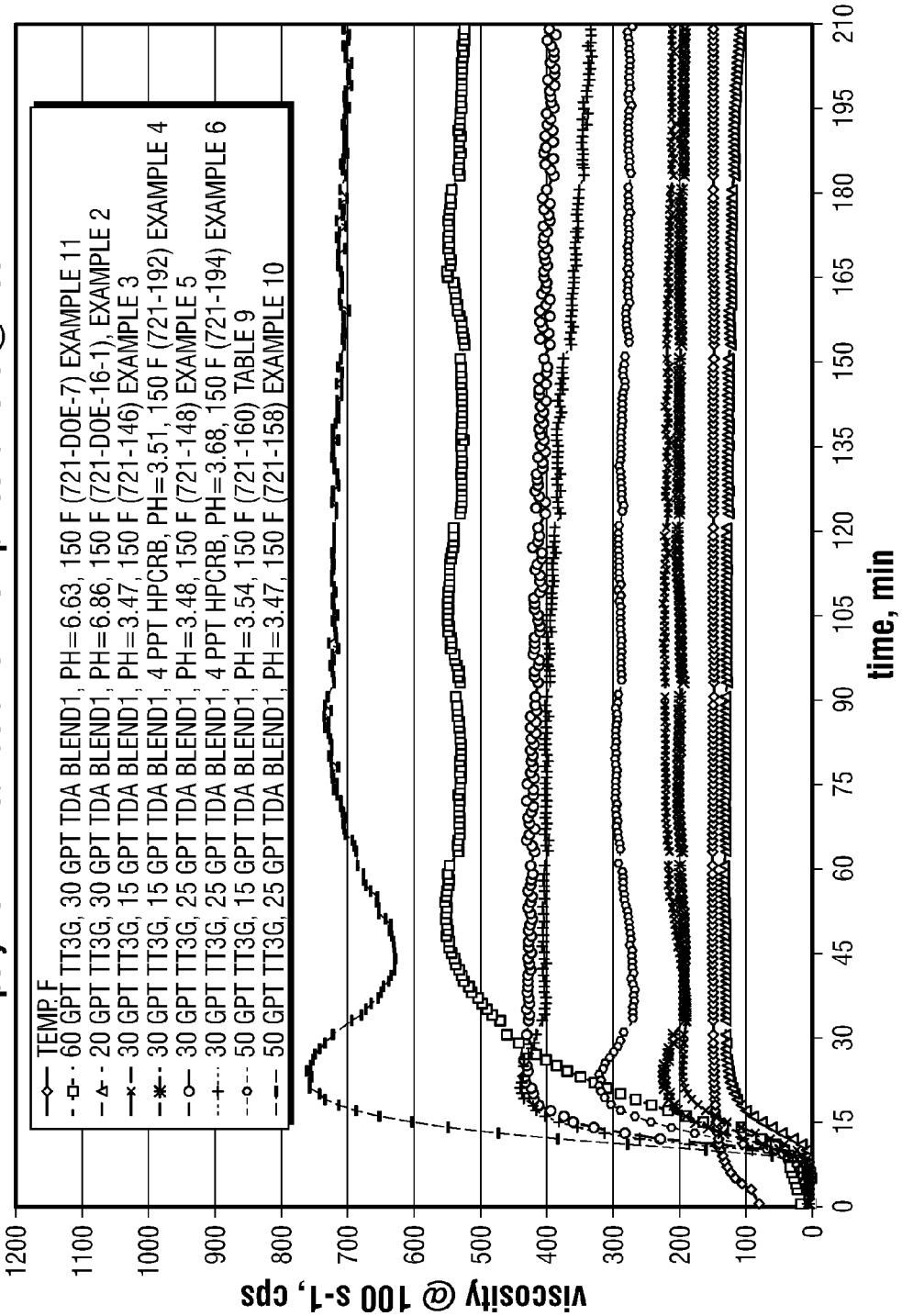

The Fann 50 tests were conducted by transferring 50 ml of the fluid into a Fann 50 cup and placing it on the Fann 50 viscometer. The fluid was initially sheared at 100 sec$^{-1}$ for 30 seconds, followed by a rate sweep using 105, 85, 62, and 40 sec$^{-1}$, respectively. After the rate sweep, the pre-heated bath was raised and the shear rate adjusted to 100 sec$^{-1}$ interim rate. Measurements were recorded every 5 minutes and rate sweeps, using rates defined above, were made every 30 minutes. The stresses and rates from the sweeps were used to calculate the power law indices n' and K'. The test lasted at least three hours. The results of the test are shown in FIGS. 1 and 2 and summarized in Table 1, below.

TABLE 1

| Low pH system, Example # | Thermogellant 3G(gpt) | Surfactant(gpt)TDA blend 1 | temp (° F.) | visc @ 100 s$^{-1}$, cps, 180 min | BRKR-HPCRB (ppt) | pH | |
|---|---|---|---|---|---|---|---|
| 1 | 70 | 0 | 200 | 22 | 0 | 3.31 | DI water |
| 2 | 20 | 30 | 150 | 121 | 0 | 6.86 | Fresh Water |
| 3 | 30 | 15 | 150 | 214 | 0 | 3.47 | DI water |
| 4 | 30 | 15 | 150 | 198 | 4 | 3.51 | DI water |
| 5 | 30 | 25 | 150 | 406 | 0 | 3.48 | DI water |
| 6 | 30 | 25 | 150 | 352 | 4 | 3.68 | DI water |
| 7 | 40 | 20 | 200 | 499 | 0 | 3.44 | DI water |
| 8 | 40 | 20 | 200 | 134 | 2 | 3.46 | DI water |
| 9 | 50 | 15 | 150 | 277 | 0 | 3.54 | DI water |
| 10 | 50 | 25 | 150 | 701 | 0 | 3.47 | DI water |
| 11 | 60 | 30 | 150 | 543 | 0 | 6.63 | Fresh Water |
| 12 | 80 | 20 | 225 | 714 | 0 | 5.88 | Fresh Water |
| | | Surfactant TDA-6:9:12 (gpt) | | | | | |
| 13 | 40 | 10.0:0.0:5.0 | 200 | 578 | 0 | 3.56 | DI water |
| 14 | 40 | 5.0:10.0:0.0 | 200 | 647 | 0 | 3.46 | DI water |
| 15 | 40 | 15.0:0.0:0.0 | 200 | 117 | 0 | 3.47 | DI water |
| | | Surfactant PSA-2L (gpt) | | | | | |
| 16 | 40 | 15 | 200 | 140 | 0 | 3.7 | DI water |

Figure 3:
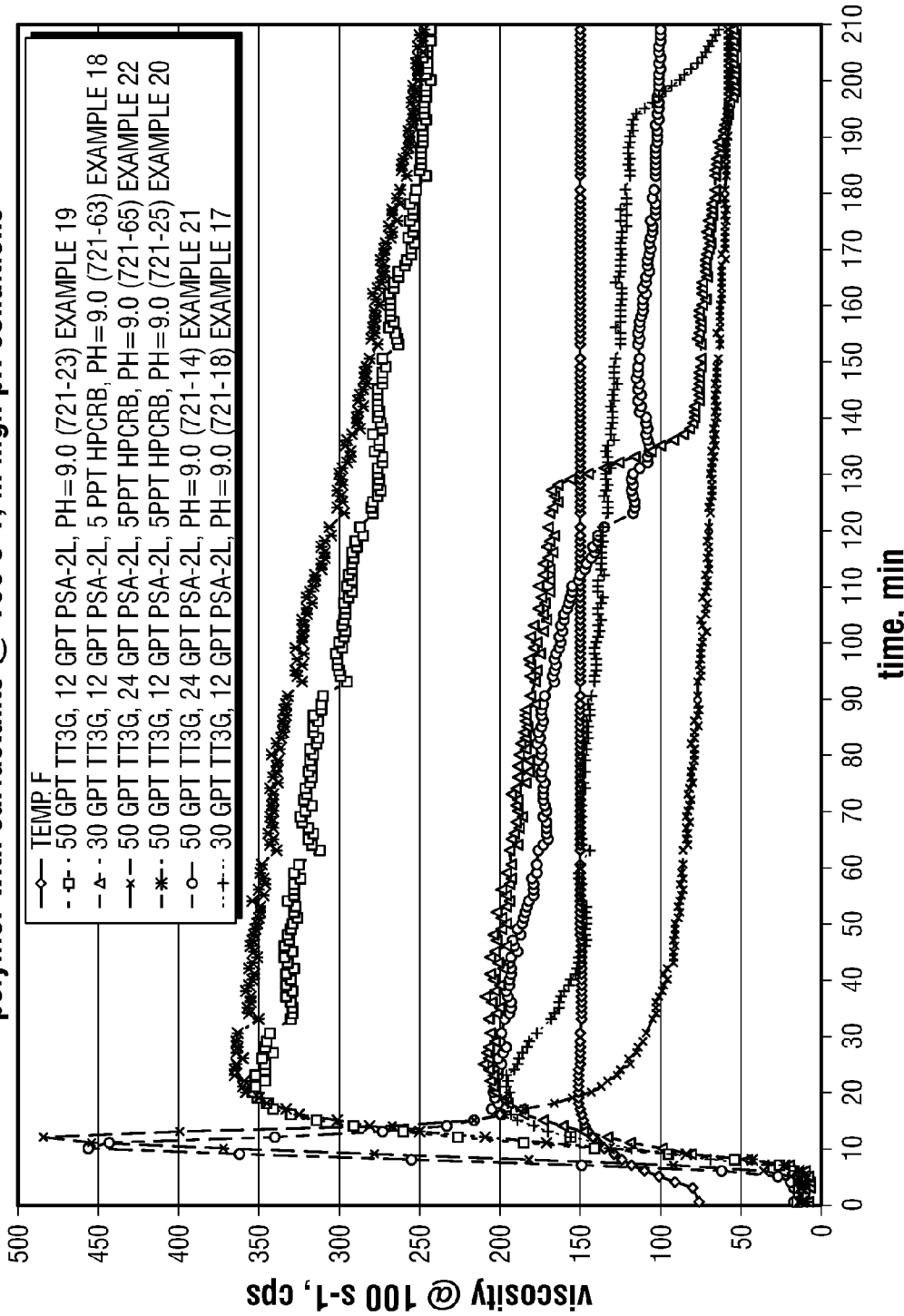

For the high pH system a similar procedure was used: A calculated amount of polymer was added to a calculated volume of either DI water or tap water being stirred at 500 rpm, using an overhead mixer, followed by surfactant (PSA-2L) until a homogenous phase was obtained. The pH was adjusted to a value of 9.0 by adding BF-7L (high pH buffer from BJ Services) drop wise. The results of the test for high pH compositions are shown in FIG. 3 and summarized in Table 2, below.

TABLE 2

| High pH, system BF7L (9.0) Example # | Thermogellant 3G(gpt) | Surfactant(gpt)PSA-2L | temp (° F.) | visc @ 100 s$^{-1}$, cps, 180 min | BRKR-HPCRB (ppt) | pH | |
|---|---|---|---|---|---|---|---|
| 17 | 30 | 12 | 150 | 117 | 0 | 9 | DI water |
| 18 | 30 | 12 | 150 | 55 | 5 | 9 | DI water |
| 19 | 50 | 12 | 150 | 247 | 0 | 9 | DI water |
| 20 | 50 | 12 | 150 | 255 | 5 | 9 | DI water |
| 21 | 50 | 24 | 150 | 101 | 0 | 9 | DI water |
| 22 | 50 | 24 | 150 | 58 | 5 | 9 | DI water |

For systems that required a breaker, the breaker was first added to Fann 50 cup, followed by fluid prior to placing it on the Fann 50 viscometer.

Results

Low pH Fluids with TDA Blend 1

The polymer fluid system by itself showed much lower viscosity. For e.g. 70 gpt polymer showed only 22 cP at 180 min. at 200° F. (Example 1). Compare this to 40-gpt polymer, 20 gpt TDA blend 1 surfactant that showed 499 cP under identical conditions (Example 7).

The synergistic effect of surfactant enhancing fluid viscosity can be seen by comparing data in Example 9 and 10. With 50 gpt polymer, 15 gpt TDA blend 1, the fluid exhibits 277 cP with 50 gpt polymer and 15 gpt surfactant. A similar effect can be seen by comparing data in Examples 5 vs 10 and Example 2 vs Example 11. The data in Example 2 shows a low viscosity 121 cP for a system with 20 gpt polymer and 30-gpt TDA blend 1 surfactant. Highest viscosity of 714 cP, at 225° F., after 3 h resulted from a fluid with 80-gpt polymer, 20 gpt TDA blend 1 (Example 12).

Low pH Fluids with TDA-6, TDA-9 or TDA-12

TDA 6, TDA 9 and TDA 12 are surfactants with 6, 9 and 12 EO's on a $C_{13}$ alcohol ether. Viscosity of the thermogellant fluid seemed to depend upon the kind of TDA's used. This is shown in Example 15, 40 gpt polymer, 15 gpt TDA-6 resulted in 117 cP, at 200° F. compared to 647 cP for 40 gpt polymer with 5 gpt TDA-6 and 10 gpt TDA-9 (Example 14). Effect of TDA-12, surfactant, which has highest mole percent of ethoxylation, is seen in Example 13, with 40-gpt polymer, 10 gpt TDA-6 and 5 gpt TDA-12 resulted in 578 cP viscosity under similar conditions.

Low pH Fluid System with PSA-2L

Example 16, shows one example of a fluid with 40 gpt polymer and 15 gpt PSA-2L surfactant, resulting in viscosity 140 cP at 200° F.

Fluids at High pH

Unlike the low pH fluids, a third component, a buffer, was added to adjust pH to 9 in order to form fluids having a relatively high pH. Example 17 shows the fluid system with 30-gpt polymer with 12 gpt PSA-2L producing 117 cP viscosity, compared to 247 cP using 50 gpt polymer and 12-gpt surfactant (Example 19). This shows the effect of increased polymer concentration leading to higher viscosity. Fluid with viscosity of 101 cP resulted when 50-gpt polymer and 24 gpt PSA-2L was used (Example 21).

Fluid with Breaker

Thermogellant fluid systems can be broken using oxidizing agents. This is shown by comparing data in Example 7 and 8. A fluid system with 40 gpt polymer and 20 gpt TDA blend 1, lost viscosity from 499 cP to 134 cP after 3 h at 200° F. when 2 ppt HighPerm CRB breaker (an encapsulated oxidizing breaker from BJ Services) was used.

Conductivity Tests

Conductivity tests were conducted according to the International Standard ISO 13503-5 "Procedures for measuring the long-term conductivity of proppants". A standard 10 in² API conductivity cell was fitted with Ohio Sandstone wafers to simulate the formation. The test proppant was placed between the sealed sandstone wafers and fluid (deionized water) was then flowed through the proppant pack while maintaining Darcy flow with 300 psi (2.07 MPA) back pressure. The differential pressure was measured across a 5 inch (12.7 cm) section of the proppant pack using a Rosemount CD 3051 differential pressure transducer. The flow rate was measured using a Micromotion mass flow meter. An Isco 260D programmable pump was used to apply and maintain the effective closure stress while heaters and thermocouples on the cell maintained the required temperature conditions. The baseline conductivity and permeability of the test proppant was initially determined after flowing water for 50 hours. This measurement was used as the reference value in determining the regain conductivity and permeability as a percent of the initial baseline. Following the baseline measurement, the fracture fluid system was injected into the proppant pack to simulate leakoff and filter cake build up. More specifically, 5 pore volumes (60-80 ml) of the fluid were pumped through the proppant pack at 10 ml/min with a backpressure of 300 psi (2.07 MPa) at the outlet. At the same time, some of the fluid can leakoff through the top and bottom sandstone wafers to atmospheric pressure (300-psi differential). This allows the fluid to build a filter cake within the proppant pack. The leakoff filtrate can be collected and measured. Following fluid injection, the proppant pack and fluid were shut-in (no-flow) overnight (typically 20 to 24 hours), allowing the fluid to break. After the shut-in period, the proppant pack cleanup was begun.

Water flow was restarted a very low rate and progressively increased over several hours. The flow rate was finally set at the same rate used to determine the baseline data, typically 10 ml/min, and left overnight. At this point the regain conductivity and permeability measurements began. The proppant pack was left to cleanup for a further 50 hours or more before the "water only" regain conductivity and permeability was determined. The results of the regain conductivity at 250° F. for a fluid with a formulation of 60 gpt polymer, 18 gpt PSA2L, 2 gpt BF 7L (pH=10.2), 9 ppt HPCRB were 100%.

Although various embodiments have been shown and described, the present disclosure is not so limited and will be understood to include all such modifications and variations as would be apparent to one skilled in the art.

What is claimed is:

1. A thermothickening composition comprising:
   a surfactant; and
   a thermothickening polymer that is the product of at least the following monomers:
   a non-ionic hydrosoluble unsaturated amide monomer;
   an ionic monomer; and
   an unsaturated dicarboxylic acid half ester having a heat sensitive functional group.

2. The composition of claim 1, wherein the surfactant is a non-ionic surfactant.

3. The composition of claim 1, wherein the surfactant is an alkoxylated alcohol.

4. The composition of claim 1, wherein the surfactant is chosen from ethoxylated alcohols of Formula 1:

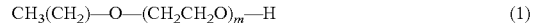

$$CH_3(CH_2)_n-O-(CH_2CH_2O)_m-H \qquad (1)$$

where m is chosen from integers ranging from about 3 to about 20, and n chosen from integers ranging from about 5 to about 20.

5. The composition of claim 1, wherein the surfactant comprises a mixture of two or more different ethoxylated alcohols.

6. The composition of claim 1, wherein the amide monomer is chosen from at least one of acrylamide, N-substituted hydrosoluble derivatives of acrylamide and hydrosoluble N-vinylamides.

7. The composition of claim 1, wherein the amide monomer is acrylamide.

8. The composition of claim 1, wherein the ionic monomer is chosen from at least one of acrylic acid and salts thereof, methacrylic acid and salts thereof, maleic anhydride, acrylamido-methylpropyl sulfonic acid and salts thereof, styrene-sulfonic acid and salts thereof, and vinyl sulfonic acid and salts thereof.

9. The composition of claim 1, wherein the ionic monomer is chosen from acrylamido-methylpropyl sulfonic acid and salts thereof.

10. The composition of claim 1, wherein the heat sensitive group is a side chain chosen from methylcellulose, hydroxypropylcellulose, polyvinyl alcohol-vinyl acetate copolymers, poly(ethylene glycol), polypropylene glycol, polymethacrylic acid, poly-N-vinyl-oxazolidone, partially acetalized polyvinyl alcohol, partially cyanoethylated polyvinyl alcohol, poly-N-isopropylacrylamide, poly(vinyl methyl ether), poly-L-proline, polyamino acids, proteins and copolymers made from hydrophobic and hydrophilic monomers.

11. The composition of claim 1, wherein the heat sensitive group is a substituted or unsubstituted side chain chosen from polyoxyethylene, polyoxypropylene or a polymer chain comprising units of both oxyethylene and oxypropylene.

12. The composition of claim 1, wherein the unsaturated dicarboxylic acid half ester is a compound of formula 3:

$$HOOC-R^4-COOR^5 \qquad (3)$$

where
   $R^4$ is a linear or branched $C_2$ to $C_8$ alkenyl group; and
   $R^5$ is a substituted or unsubstituted side chain chosen from polyoxyethylene, polyoxypropylene or a polymer chain comprising units of both oxyethylene and oxypropylene.

13. The composition of claim 12, wherein the dicarboxylic acid ester unit is a compound of formula 4:

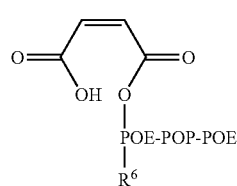

(4)

where $R^6$ is chosen from —OH, —OC(O)C=CC(O)OH, and —OC(O)C=CC(O)O—POE-POP—POE-OH.

14. The composition of claim 1, further comprising an initiator.

15. The composition of claim 1, further comprising one or more additional ingredients chosen from corrosion inhibitors, non-emulsifiers, iron control agents, delay additives, silt suspenders, flowback additives, gel breakers, anti-foam agents and proppants.

16. A method for servicing a wellbore, the method comprising introducing the thermothickening composition of claim 1 into the wellbore.

17. The method of claim 16, wherein the thermothickening composition has an initial viscosity, and further comprising exposing the thermothickening composition to heat sufficient to cause the fluid to realize an increase in viscosity compared to the initial viscosity.

18. The composition of claim 1 wherein the thermothickening composition exhibits the property of increasing in viscosity as a result of thermal activation.

19. A thermothickening composition comprising:
a surfactant; and
a thermothickening polymer having formula 5

$$A_x B_y C_z \qquad (5)$$

where
A is an ionic functional group;
B is a non-ionic hydrosoluble unsaturated amide functional group;
C is an unsaturated dicarboxylic acid half ester unit having a heat sensitive functional group;
x ranges from about 5 to about 50 wt %,
y ranges from about 10 to about 50 wt. % and
z ranges from about 10 to about 70 wt %, where x, y and z represent the weight % of the corresponding polymer units based on the total molecular weight of the polymer.

20. The composition of claim 19, wherein the surfactant is a non-ionic surfactant.

21. The composition of claim 19, wherein the surfactant is an alkoxylated alcohol.

22. The composition of claim 19, wherein the surfactant is chosen from ethoxylated alcohols of Formula 1:

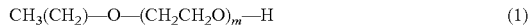

$$CH_3(CH_2)_n\text{—}O\text{—}(CH_2CH_2O)_m\text{—}H \qquad (1)$$

where m is chosen from integers ranging from about 3 to about 20, and n chosen from integers ranging from about 5 to about 20.

23. The composition of claim 22, wherein the thermothickening polymer is a compound of formula 6:

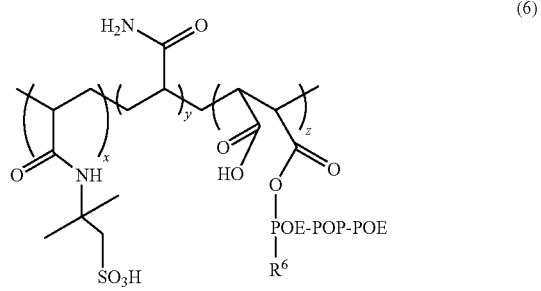

(6)

where $R^6$ is chosen from —OH, —OC(O)C═CC(O)OH, and —OC(O)C═CC(O)O—POE-POP—POE-OH.

24. A method for servicing a wellbore, the method comprising introducing the thermothickening composition of claim 23 into the wellbore.

25. The composition of claim 19, wherein the surfactant comprises a mixture of two or more different ethoxylated alcohols.

26. The composition of claim 25, wherein the ionic functional group corresponds to one or more of the following monomers: acrylic acid and salts thereof, methacrylic acid and salts thereof, maleic anhydride, acrylamido-methylpropyl sulfonic acid and salts thereof, styrenesulfonic acid and salts thereof, and vinyl sulfonic acid and salts thereof.

27. The composition of claim 26, wherein the heat sensitive group is a side chain chosen from methylcellulose, hydroxypropylcellulose, polyvinyl alcohol-vinyl acetate copolymers, poly(ethylene glycol), polypropylene glycol, polymethacrylic acid, poly-N-vinyl-oxazolidone, partially acetalized polyvinyl alcohol, partially cyanoethylated polyvinyl alcohol, poly-N-isopropylacrylamide, poly(vinyl methyl ether), poly-L-proline, polyamino acids, proteins and copolymers made from hydrophobic and hydrophilic monomers.

28. The composition of claim 26, wherein the heat sensitive group is a substituted or unsubstituted side chain chosen from polyoxyethylene, polyoxypropylene or a polymer chain comprising units of both oxyethylene and oxypropylene.

29. A method for servicing a wellbore, the method comprising introducing the thermothickening composition of claim 28 into the wellbore.

30. The composition of claim 19, wherein the non-ionic hydrosoluble unsaturated amide functional group corresponds to one or more of the following monomers: acrylamide, N-substituted hydrosoluble derivatives of acrylamide and hydrosoluble N-vinylamides.

31. A method for servicing a wellbore, the method comprising introducing the thermothickening composition of claim 19 into the wellbore.

32. The composition of claim 19 wherein the thermothickening composition exhibits the property of increasing in viscosity as a result of thermal activation.

33. A thermothickening composition comprising:
water;
a surfactant; and
a thermothickening polymer that is the product of at least the following monomers:
a non-ionic hydrosoluble unsaturated amide monomer;
an ionic monomer; and
an unsaturated dicarboxylic acid half ester having a heat sensitive functional group, the thermothickening composition exhibiting the property of increasing in viscosity as a result of thermal activation.

34. The composition of claim 33 wherein, for the exhibited property of increasing in viscosity as a result of thermal activation, the thermothickening composition is configured to form a gel.

35. The composition of claim 33 wherein the property of increasing in viscosity as a result of thermal activation occurs without removal of the water.

* * * * *

UNITED STATES PATENT AND TRADEMARK OFFICE
CERTIFICATE OF CORRECTION

PATENT NO. : 8,333,242 B2
APPLICATION NO. : 12/371395
DATED : December 18, 2012
INVENTOR(S) : Gupta et al.

It is certified that error appears in the above-identified patent and that said Letters Patent is hereby corrected as shown below:

In the Claims

Claim 4, Col. 12, Line 5-11 should read

4. The composition of claim 1, wherein the surfactant is chosen from ethoxylated alcohols of Formula 1:
$CH_3(CH_2)_n\text{-}O\text{-}(CH_2CH_2O)_m\text{-}H$ (1)
where m is chosen from integers ranging from about 3 to about 20, and n is chosen from integers ranging from about 5 to about 20.

Claim 22, Col. 13, Line 38-41 should read

22. The composition of claim 19, wherein the surfactant is chosen from ethoxylated alcohols of Formula 1:
$CH_3(CH_2)_n\text{-}O\text{-}(CH_2CH_2O)_m\text{-}H$ (1)
where m is chosen from integers ranging from about 3 to about 20, and n is chosen from integers ranging from about 5 to about 20.

Signed and Sealed this
Eleventh Day of March, 2014

Michelle K. Lee
*Deputy Director of the United States Patent and Trademark Office*